(12) United States Patent
Cardenas-Valencia et al.

(10) Patent No.: US 7,958,906 B2
(45) Date of Patent: Jun. 14, 2011

(54) THERMALLY INDUCED SINGLE-USE VALVES AND METHOD OF USE

(75) Inventors: Andres M. Cardenas-Valencia, Tampa, FL (US); Jay Dlutowski, Safety Harbor, FL (US); Michelle Cardenas, Tampa, FL (US); John Bumgarner, Clearwater, FL (US); Weidong Wang, Oldsmar, FL (US); Larry Langebrake, Seminole, FL (US)

(73) Assignee: University of South Florida, Tampa, FL (US)

( * ) Notice: Subject to any disclaimer, the term of this patent is extended or adjusted under 35 U.S.C. 154(b) by 1098 days.

(21) Appl. No.: 11/734,090

(22) Filed: Apr. 11, 2007

(65) Prior Publication Data

US 2010/0180953 A1    Jul. 22, 2010

Related U.S. Application Data

(60) Provisional application No. 60/744,664, filed on Apr. 11, 2006.

(51) Int. Cl.
*F16K 17/36* (2006.01)
(52) U.S. Cl. ............... 137/72; 137/67; 251/11
(58) Field of Classification Search ........... 137/67, 137/72; 251/11
See application file for complete search history.

(56) References Cited

U.S. PATENT DOCUMENTS

| | | | | |
|---|---|---|---|---|
| 5,270,125 A * | 12/1993 | America et al. | ............ | 428/698 |
| 5,681,024 A * | 10/1997 | Lisec et al. | ............ | 251/11 |
| 6,102,897 A * | 8/2000 | Lang | ............ | 137/67 |
| 6,527,003 B1 * | 3/2003 | Webster | ............ | 251/11 |
| 6,669,683 B2 * | 12/2003 | Santini et al. | ............ | 604/890.1 |
| 6,730,072 B2 * | 5/2004 | Shawgo et al. | ............ | 604/890.1 |
| 6,875,208 B2 * | 4/2005 | Santini et al. | ............ | 604/890.1 |
| 7,159,618 B2 * | 1/2007 | Broyer et al. | ............ | 137/828 |

OTHER PUBLICATIONS

M. A. Schwarz and P.C. Hauser, "Recent developments in detection methods for micro fabricated analytical devices", Lab on a Chip, (2001), 1-6.
B.A. Warneke, M.D. Scott, B.S. Leibowitz, L. Zhou, C.L. Bellew, J.A. Chediak, J.M. Kahn, B.E. Boser, K.S.J. Pister. "An Autonomous 16mm3 Solar-Powered Node for Distributed Wireless Sensor Networks," IEEE International Conference on Sensors 2002, (2002) Orlando, FL, Jun. 12-14.
D. K. Mee. "Microsensors to monitor storage and maintenance". Proceedings for Life Cycle Systems Engineering Workshop. Nov. 6-7.
A. J. Tuedos, G. A. J. Besselink, R. B. M. Schasfoort. "Trends in miniaturized total analysis systems for point-of-care testing in clinical chemistry", Lab on a Chip, (2001), 83-95.
M. L. Janowiak, A. M. Cardenas-Valencia, M. L. Hall, and D. P. Fries. "Development of a mobile sensing system for in situ water analysis based on solid-phase extraction-reflection spectroscopy," Meas. Sci. and Techn. (2005), 16, 729-737.
M. Felton,"The New Generation of Microvalves". Anal. Chem. 75(19), (2003), 429A-432A.

(Continued)

*Primary Examiner* — John Rivell
(74) *Attorney, Agent, or Firm* — Molly L. Sauter; Smith & Hopen, P.A.

(57) ABSTRACT

In accordance with an embodiment of the present invention, a thermally induced single-use valve is provided including a silicon wafer having a top surface and a bottom surface and at least one cavity formed in the bottom surface of the wafer, a thermally deformable membrane suspended across the cavity on the top surface of the wafer and at least one resistive element patterned on top of the thermally deformable membrane.

17 Claims, 17 Drawing Sheets

OTHER PUBLICATIONS

V. Linder, S. K. Sia, G. M. Whitesides. "Reagent-Loaded Cartridges for Valveless and Automated Fluid Delivery in Microfluidic Devices" Anal. Chem, 77(1), (2005), 64-71.

K.B. Lee, and L. Lin. "Electrolyte-based on-demand and disposable microbattery," J. Microelectromechanical systems, 12, (2003) 840-847.

F. Sammoura, K.B. Lee, and L. Lin. "Water activated disposable and long shelf life microbatteries," Sensors and Actuators A: Physical (2004) 111(1) 79-86.

Cardenas-Valencia, Andres M. Challa, Vinod R. Fries, David Langebrake, Larry Benson, Robert F. and Bhansali, Shekhar. "A micro-fluidic galvanic cell as an on-chip power source" Sensors and Actuators, B: Chemical (2003) 95 (1-3) 406-413.

Van Den Berg A., and Lammerink, T. S. J., 1998 Micro Total Analysis Systems: Microfluidic Aspects, Integration Concepts and Applications. Topics in Cur. Chem. vol. 194.

Shoji, S. Fluids for Sensors Systems. 1998 Topics in Cur. Chem., vol. 194 pp.

Madou M. J. Lee, L. J., Daunert, S., Lai, S. and Shih, C. H., 2001, Design and Fabrication of CD-like Microfluidic Platforms for Diagnostics: Microfluidic Functions, Biom. Microdev., vol. 3, No. 3, pp. 245-254.

S. Wu, Q. Lin, Y. Yuen and Y. C. Tai. MEMS flow sensors for nano-fluidic applications Sensors and Actuators, A: Physical v 89 n 1-2 Mar. 2001. p. 152-158.

Chien-Chong Hong, Suresh Murugesan, Sanghyo Kim, Gregory Beaucage, Jin-Woo Choi, Chong H. Ahn. A functional on-chip pressure generator using solid chemical propellant for disposable lab-on-a-chip, , Lab on a Chip, 2003, 281-286.

H. Chien-Chong, C. Jin-Woo, and C.H. Ahn. Disposable air-bursting detonators as an alternative on-chip power source Proc. of the 15th IEEE Int. Conf. on MEMS, (2002) 240-243.

M. Hu, H. Du, S.-F.Ling, Y. Fu, Q. Chen, L. Chow and B. Li. "A silicon-on-insulator based micro check valve" J. Micromech. Microeng. (2004) 14 (3) 382-387.

W. H. Grover, A. M. Skelley, C. N. Liu, E. T. Lagally and R. A. Mathies. "Monolithic membrane valves and diaphragm pumps for practical large-scale integration into glass microfluidic devices" Sensors and Actuators B: Chemical, (2003) 89(3), 315-323.

J. Puigcorbe, D. Vogel, B. Michel, A. Vila, I. Gracia, C. Cane, and J. R. Morante. J. Micromech. Microeng. 13 (2003) 548-556.

N-T Nguyen, T.Q. Truong, K. K Wong, S. S. Ho and C L. N. Low. "Micro check valves for integration into polymeric microfluidic devices" J. Micromech. Microeng, (2004) 14 (1), 69-75.

C. Rossi, P. Temple-Boyer, and D. Esteve. Realization and Performance of thin SiO2/SiNx membrane for microheater with dielectric stacked membranes. Sensors and Actuators A 64 241-245.

C. Rossi, E. Scheid, and D. Esteve. Theoretical and Experimental Study of Silicon micromachined heater with dielectric stacked membranes. Sensors and Actuators A 3 183-189.

D. Briand, B. Van Der Schoot, N. F. De Rooij, H. Sundgren, and I. Lundstrom. Low-power micromachined MOSFET gas sensor . Journal of Microelectromechanical Systems v 9 n 3 Sep. 2000. p. 303-308.

Y. C. Lee, Chia-Yen and G.B. Lee. Micromachine-based humidity sensors with integrated temperature sensors for signal drift compensation. Journal of Micromechanics and Microengineering v 13 n 5 Sep. 2003 p. 620-627.

Y. C. Lee, Chia-Yen and G. B.Lee. MEMS-based Humidity Sensors with Integrated Temperature Sensors for Signal Drift Compensation Proceedings of IEEE Sensors v 2 n 1 2003 (IEEE cat n 03CH37498) p. 384-388.

F. Mailly, A. Giani, R. Bonnot, P. Temple-Boyer, F. Pascal-Delannoy, A. Foucaran, A. Boyer. Anemometer with hot platinum thin film. Sensors and Actuators, A: Physical v 94 n 1-2 Oct. 31, 2001 p. 32-38.

* cited by examiner (a)            (b)

(a)  (b)

(a)  (b)

THERMALLY INDUCED SINGLE-USE VALVES AND METHOD OF USE

CROSS REFERENCE TO RELATED APPLICATIONS

This application claims priority to currently pending U.S. Provisional Patent Application 60/744,664, entitled, "Thermally Induced Single-Use Valve Chips," filed Apr. 11, 2006, the contents of which are herein incorporated by reference.

STATEMENT OF GOVERNMENT INTEREST

This invention was made with Government support under Grant No. DASG60-00-C-0089 awarded by the U.S. Army Space and Missile Defense Command. The Government has certain rights in the invention.

BACKGROUND OF THE INVENTION

Micro-fluidics has been included in various analytical schemes that incorporate the well-known advantages of micro-scale transduction. A basic fluidic operation important in μTAS and Lab-on-a-chip applications is the controlled delivery of minute fluid amounts. The purposes behind hermetic fluid storage and its on-demand delivery, even as a single-use operation, are many fold. For instance, a common micro fluidic application involves the delivery of analytical reagents to a sample to induce transductions that provide information on sample state, like presence or concentration of target chemicals. Intake of samples in portable sensor systems that monitor water bodies is another application that would benefit from automated fluidic delivery. Additionally, automated fluid delivery has been exploited as a way to produce energy "on-demand" by feeding electrolytes into electrochemical cells.

Fluidic delivery mechanisms are known in the art. Pneumatically or inertiallly driven fluidic devices are preferred over electrokinetic mechanisms due to their capacity to provide a wider range of flow rates. CD-styled platforms, based on centrifugal forced actuation, are a classical example of micro fluidic schemes. Volume expanding materials are another alternative that induce pneumatic differentials to obtain micro flow. Applications that involve remote, unattended transducers, for either analytical purposes or power production, have specific requirements that challenge the direct incorporation of some of the available micro fluidic schemes. These include, besides reliability: low-power requirements, and in general, short time constants. A low power device requires that the fluid delivery is done efficiently, thus providing longer operational lives for the power sources and/or more operating device cycles. Fast actuation ensures precise control of the desired transduction. In the case of sensors, reduction of temporal lags guarantees real-time data. An attractive fluidic delivery actuation currently known in the art involves a pressurized liquid reservoir that is contained by a valve, the controllable actuated component, that when opened, delivers a fluid to the desired micro channel. Micro valves, generally activated with low powers, can be utilized for such a scheme.

The design and fabrication of such micro valves is currently known in the art. Polymeric and plastic valves and vents are innovations in micro-valving mechanisms that use non-silicon-based processing. Conventional silicon-MEMS fabrication takes advantages of the technology derived from the integrated circuit industry, such as high yield processing and the capability of wafer level device fabrication, making low-cost production possible.

Accordingly, what is needed in the art is a thermally induced single-use micro valve having low power requirements, short time constants and low-cost production capabilities.

SUMMARY OF INVENTION

In accordance with an embodiment of the present invention, a thermally induced single-use valve is provided including a silicon wafer having a top surface and a bottom surface and at least one cavity formed in the bottom surface of the wafer, a thermally deformable membrane suspended across the cavity on the top surface of the wafer and at least one resistive element patterned on top of the thermally deformable membrane.

In a particular embodiment, the thermally induced single-use valve further includes voltage supply configured to establish a voltage across the resistive element. The voltage supply may be a pulsed DC voltage supply.

In a specific embodiment the thermally deformable membrane is fabricated of silicon nitride, however other membrane materials are within the scope of the invention. The resistive element is patterned on the surface of the membrane and is preferably formed of gold or platinum. The geometric pattern of the resistive element may vary, and may include a zig-zag shape or a two-legs-in-parallel shape.

In accordance with an embodiment of the present invention, an apparatus for supplying a fluid or gas under pressure to a channel is provided. The apparatus includes at least one thermally induced single-use value further comprising, a silicon wafer having a top surface and a bottom surface and at least one cavity formed in the bottom surface of the wafer, a thermally deformable membrane suspended across the cavity on the top surface of the wafer and at least one resistive element patterned on top of the thermally deformable membrane, a voltage supply configured to establish a voltage across the resistive element, at least one pressurized reservoir for holding the fluid or gas and at least one supply line positioned between the at least one pressurized reservoir and the at least one thermally induced single-use valve. In this embodiment, when the voltage is supplied across the resistive element, the resistive elements heats up and deforms the thermally deformable membrane until it ruptures, allowing the fluid or gas to flow to the channel.

In accordance with an embodiment of the present invention, a method for supplying a fluid or gas under pressure to a channel is provided. The method includes positioning a thermally induced single-use valve between the fluid or gas and the channel, the thermally induced single-use valve further comprising a silicon wafer having a top surface and a bottom surface and at least one cavity formed in the bottom surface of the wafer, a thermally deformable membrane suspended across the cavity on the top surface of the wafer and at least one resistive element patterned on top of the thermally deformable membrane and heating the resistive element, thereby causing the thermally deformable membrane to rupture, opening the valve and releasing the fluid or gas to the channel. The resistive element may be heated using a pulsed DC supply placed across the resistive element.

The present invention describes the modeling and fabrication of MEMS valves for liquid delivery on-demand to a device. The valve design consists of a metal resistor on a silicon nitride substrate. Essentially, a metallic heater is deposited onto a silicon nitride layer then on backside of the wafer a 3 mm by 3 mm square is etched via deep reactive ion etching after a patterned aluminum masking layer centers the heater. As the resistor heats up, the silicon nitride also heats up and deforms. Stresses build up in the materials, and as the ultimate stress of the silicon nitride is exceeded the valve breaks and liquid is delivered to the device. These thermal stresses are caused by the mechanical constraints of the design, the difference between the thermal coefficients of expansion of the two materials, and any temperature gradients in the material. The temperature and stress distributions are realized through the modeling, and they can be used to look at and compare different valve designs. An important consideration in the design of the resistor is the power required to heat it to a temperature that will break the valve. If this valve is part of a liquid delivery system to a battery, then the power needed to break the valve should be a small fraction of the power produced by the battery.

BRIEF DESCRIPTION OF THE DRAWINGS

For a fuller understanding of the invention, reference should be made to the following detailed description, taken in connection with the accompanying drawings, in which:

FIG. 6(b) X: 1.807 mm); FIG. 6(c) Y: 2.967 mm; and FIG. 6(d) X: 4.078 mm. The profiles are in horizontal and vertical lines that pass through the membrane center.

FIG. 12(a) shows the energy required to break a platinum zig-zag resistor with an average thickness of 0.09 µm±0.025 µm. FIG. 12(b) shows the energy required to break a platinum zig-zag resistor with an average thickness of 0.30 µm±0.030 µm. FIG. 12(c) shows the energy required to break a gold zig-zag resistor with an average thickness of 0.15 µm±0.020 µm.

FIG. 13(a) shows the energy required to break a two-legs-parallel platinum resistor with an average thickness of 0.09 µm±0.025 µm. FIG. 13(b) shows the energy required to break a two-legs-parallel gold resistor with an average thickness of 0.15 µm±0.020 µm. The applied potential as well as the time during which the voltage was applied is shown in parenthesis. The figures clearly show the effect of the resistor design. The average potential and pulse-time (with both a plus/minus voltage and duration of the successfully tested devices) has been included close to the corresponding data cluster for each design.

DETAILED DESCRIPTION OF THE PREFERRED EMBODIMENT

Figure 1:
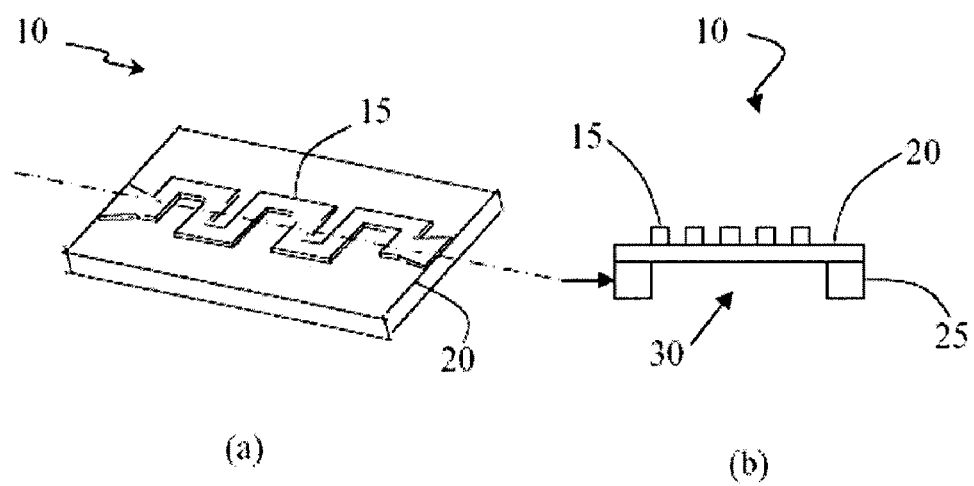
FIG. 1(a) is a top-down schematic illustration of the silicon membrane and a patterned resistor that constitute the single-use valve in accordance with an embodiment of the present invention and FIG. 1(b) is a cross-sectional view of the silicon membrane and a patterned resistor that constitute the single-use valve in accordance with an embodiment of the present invention.

Referring to FIG. 1, a single-use valve 10 in accordance with an embodiment of the present invention is illustrated having a metallic ohmic resistor 15 patterned on a silicon nitride membrane 20. The view shown in FIG. 1(a) is top-down view of the valve 10 illustrating the resistive element 15 on top of the membrane 20. The view shown in FIG. 1(b) is a cross-sectional view of the valve 10 illustrating the resistive element 15 on top of the membrane 20 and the cavity 30 formed in the silicon wafer 25. In this embodiment, upon the application of a sufficient voltage to the resistor 15, the resistor 15 heats up and causes a thermal rupture of the silicon nitride membrane 20, causing the valve to open. In this particular embodiment, the membrane is formed of silicon nitride, however other appropriate membrane materials are within the scope of the invention.

Figure 2:
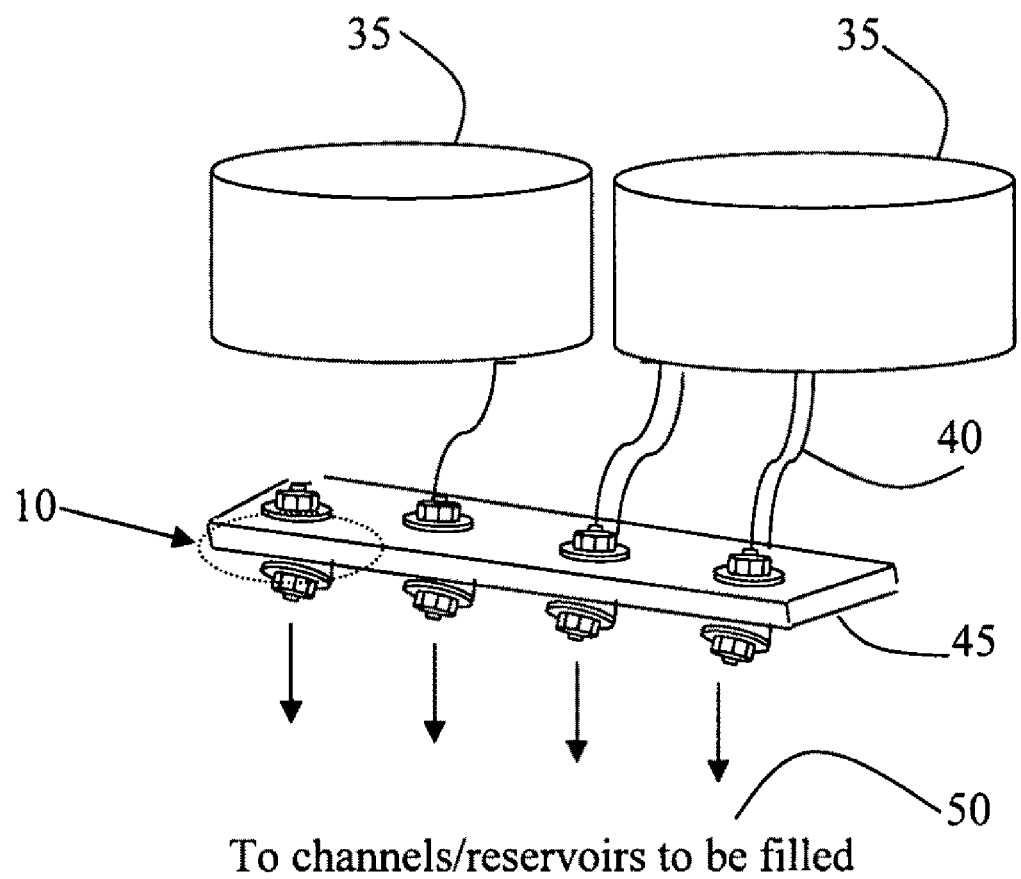
FIG. 2 is a conceptualization on the utilization of an array of the single-use valves in accordance with an embodiment the present invention.

Now with reference to FIG. 2, a conceptualization of the utilization of an array of the single-use valves 10 in accordance with the present invention is illustrated. In this case, the single-use valves 10 would be in the position as illustrated. In addition the system includes pressurized reservoirs 35 containing the fluid or gas to be delivered and air-filled thin hoses 40 connecting the reservoirs 35 to an array of valves 45. Upon activation of the single-use valves 10 of the array of valves 45, the resistive element 15 is heated to cause the membrane 20 to rupture and the fluid or gas contained in the pressurized reservoirs 35 to be delivered to the channels or reservoirs to be filled 50 as shown.

If single-use valves, as shown in FIG. 1, are to be used in a stored-pneumatic-energy fluidic mechanism, two important issues must be considered. On one hand a mechanically strong membrane to contain the pressurized fluid is desirable. The stronger the membrane, the higher the pressure differential it can withstand, and the faster the liquid filling of the desired channel/reservoir. On the other hand, the membrane has to be reliably broken with small amounts of energy and the breakage time lag must be small. Phenomenological mechanical models, solved generally using numerical techniques, are well documented in literature. A simple descriptive model is used herein to quantify the maximum pressure differential that the membranes can withstand. The descriptive model is valid for a membrane with large planar dimensions in comparison with its thickness, (which is the case herein) and can be used to relate the required breakage pressure and the membrane dimensions. A force balance can be written, when the pressures facing each face of the membrane 20 changes, as an equation of the form, $$\oint F dA = D^2 \int dP = 4t\tau D + D^2(a+b/D^2) \quad (1)$$

F is the perpendicular force; A is the area of the membrane (considered constant and equal to $D^2$), P the pressure, t the membrane thickness and D the length of the membrane square side. The left hand side term $D^2 \int dP$ represents a uniform pneumatic force loading due to the average pressure differential; the term $4t\tau D$ includes the maximum shear stress, $\tau$, and is the critical shearing force load at the membrane edges. The "b" in the last term, $D^2(a+b/D^2)$, is an offset (positive or negative) force due to the membrane deviation from flatness and residual stresses resulting from the membrane fabrication and "$b/D^2$" encompass potential instrumental errors arising from the utilized measurement set-up.

To decide on the resistor-designs, the basic coupled phenomenological equations that relate energetic and thermal effects are considered. First, the power, Q, is given by the potential, V, and the resistance, R, of the ohmic resistor 15, $$\dot{Q} = V^2/R \quad (2)$$

Second, the quantification of the resistor's temperature increment is estimated according to an energy balance that can be generically written as $\dot{Q}$=Change in thermal energy+Heat losses via conduction, convection and radiation (3)

Additionally, the temperature change in the resistor 15, ($T-T_o$) induces a different resistance value, $R^T$, that depends on the physicochemical characteristics of the metal ($\rho$ is the metal resistivity and $\alpha$ is the thermal resistivity) and on the dimensions (the length, L and the cross sectional area, $A_{cross}$)

$$R^T = \rho(1+\alpha(T-T_o))L/A_{cross} \quad (4)$$

The thermal gradient (first term of the right hand side of equation 4) and the magnitude of the heat losses dictate the temperature reached by the membrane/resistor system as well as the rate of temperature increase. One way to reduce the thermal losses is to reduce the proximity of the resistor 15 to the silicon nitride membrane 20 edges.

Figure 3:
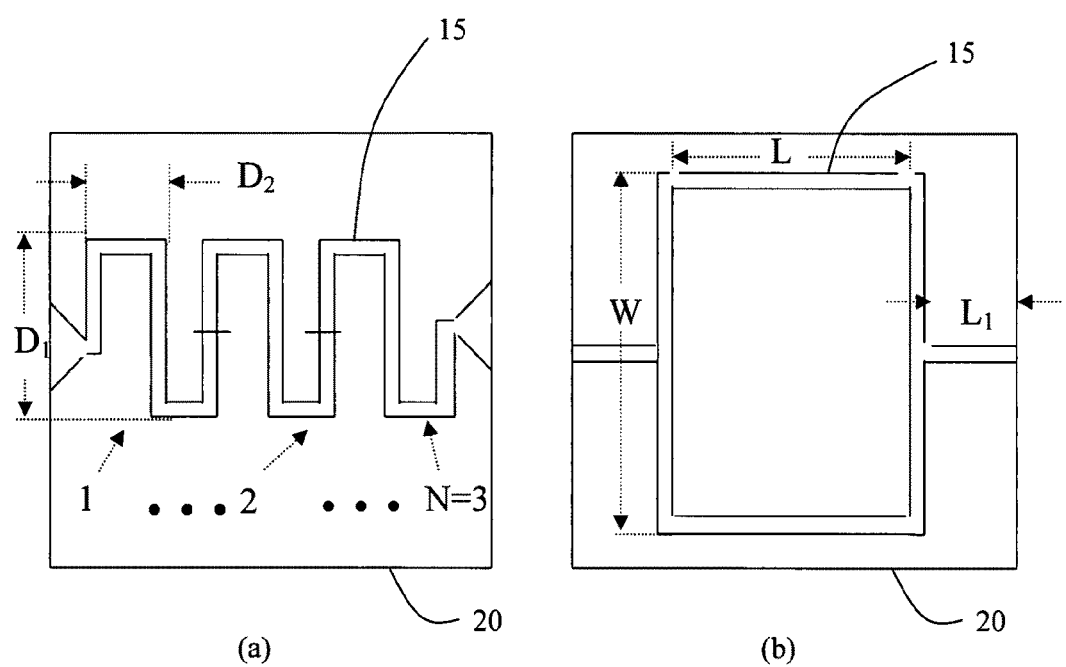
FIG. 3 is an illustration of two possible shapes of the resistive elements in accordance with various embodiments of the present invention.

FIG. 3 illustrates two possible resistor 15 designs whose dimensions are varied to gain insight into the relative magnitude of the heat losses. The first design illustrated in FIG. 3(a), and denoted as "L"-type for reference, posses a square zig-zag shape. The second resistor design illustrated in FIG. 3(b), denoted here as "P"-type for reference, has two legs connected in parallel. Both resistor designs illustrated are symmetrically centered with respect to both the horizontal axis and the vertical axis. The illustrated dimensions of the resistor designs are summarized below in Table 1. It is expected that the first design type (L) would require less current to heat to a certain temperature than the second P-design. The parallel resistor design has however a smaller resistance, which permits the application of smaller voltages compared to those relative to the L-type design.

TABLE 1

Dimensions of L and P types thin metal resistors.

| Resistor Design | Varied dimensions | | | | | Resistor Design | Varied dimensions | | |
|---|---|---|---|---|---|---|---|---|---|
| | $D_1$ (mm) | $D_2$ (mm) | Width (μm) | N | Total Length (mm) | | W (mm) | L (mm) | $L_1$ (mm) |
| $L_1$ | 2.0 | 0.2 | 25 | 5 | 22.0 | $P_1$ | 2.0 | 2.55 | 0.225 |
| $L_2$ | 2.5 | 0.2 | 25 | 4 | 21.6 | $P_2$ | 2.375 | 2.55 | 0.225 |
| $L_3$ | 2.5 | 0.2 | 25 | 5 | 27.0 | $P_3$ | 2.75 | 2.55 | 0.225 |
| $L_4$ | 2.5 | 0.2 | 25 | 6 | 32.4 | | | | |

Figure 4:
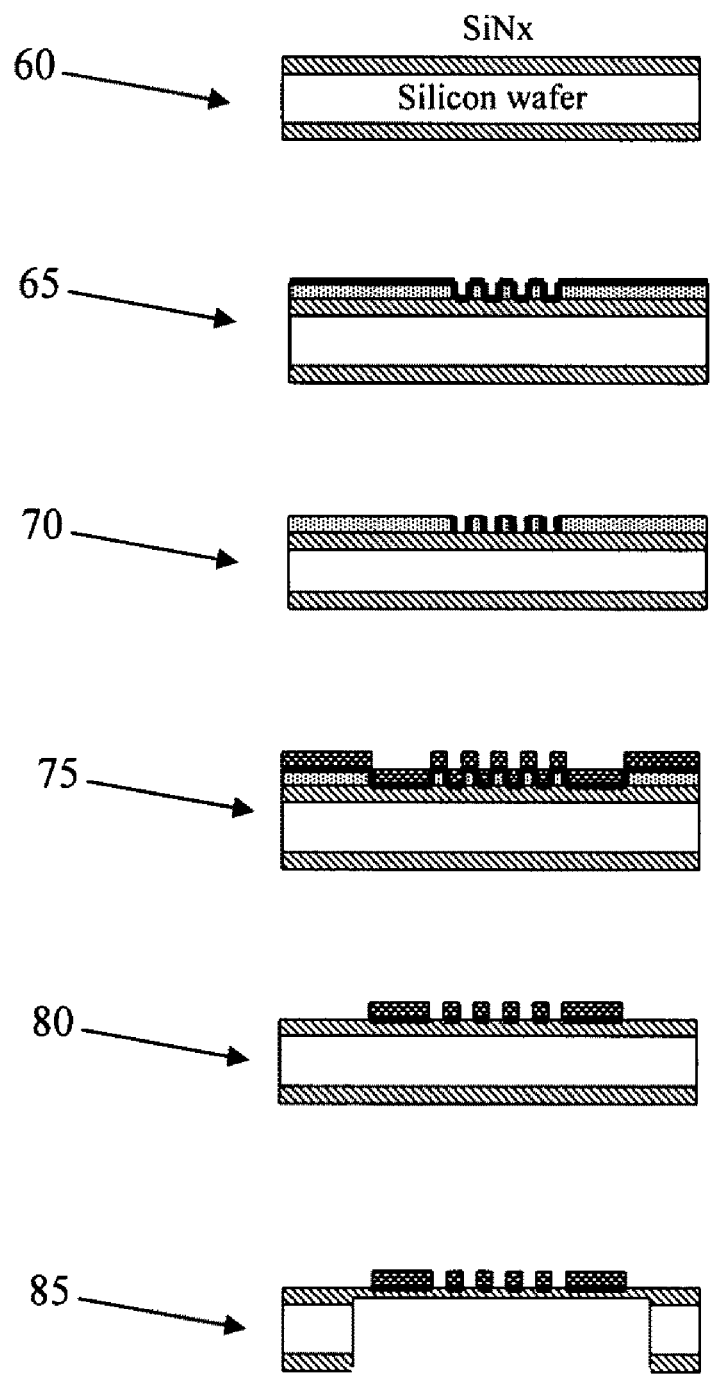
FIG. 4 is a diagram illustrating the process flow for forming the resistive element and the membrane of the valve in accordance with an embodiment of the invention.
Figure 5:
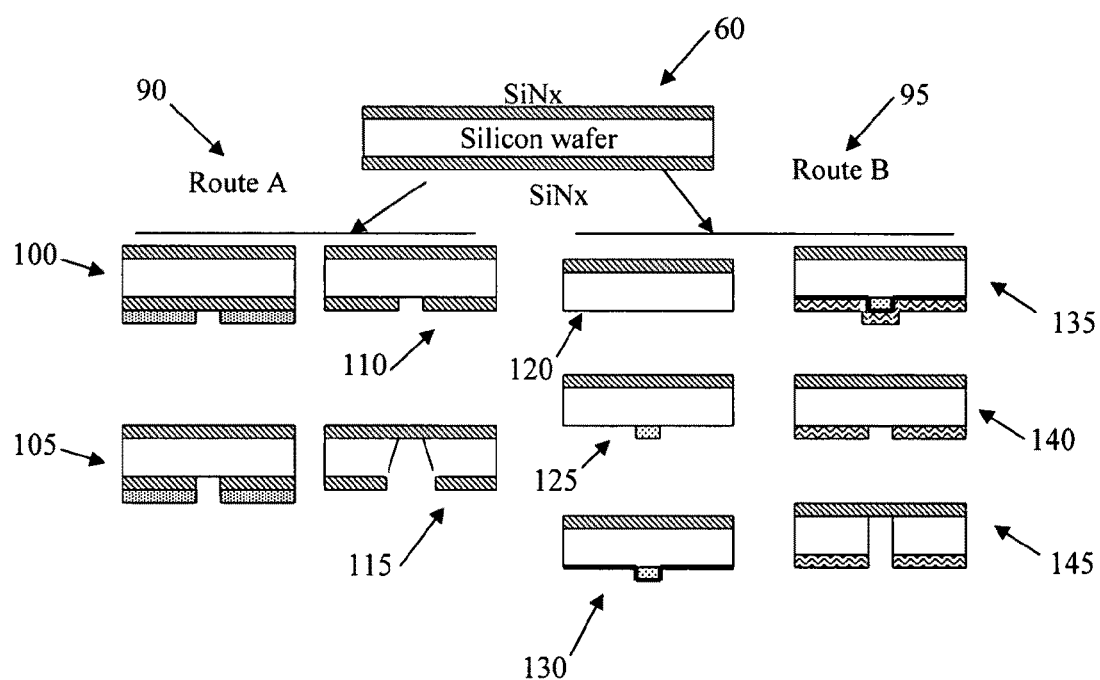
FIG. 5 is a diagram illustrating the process flow for forming the cavity within the silicon for the valve in accordance with an embodiment of the invention.
Figure 6A:
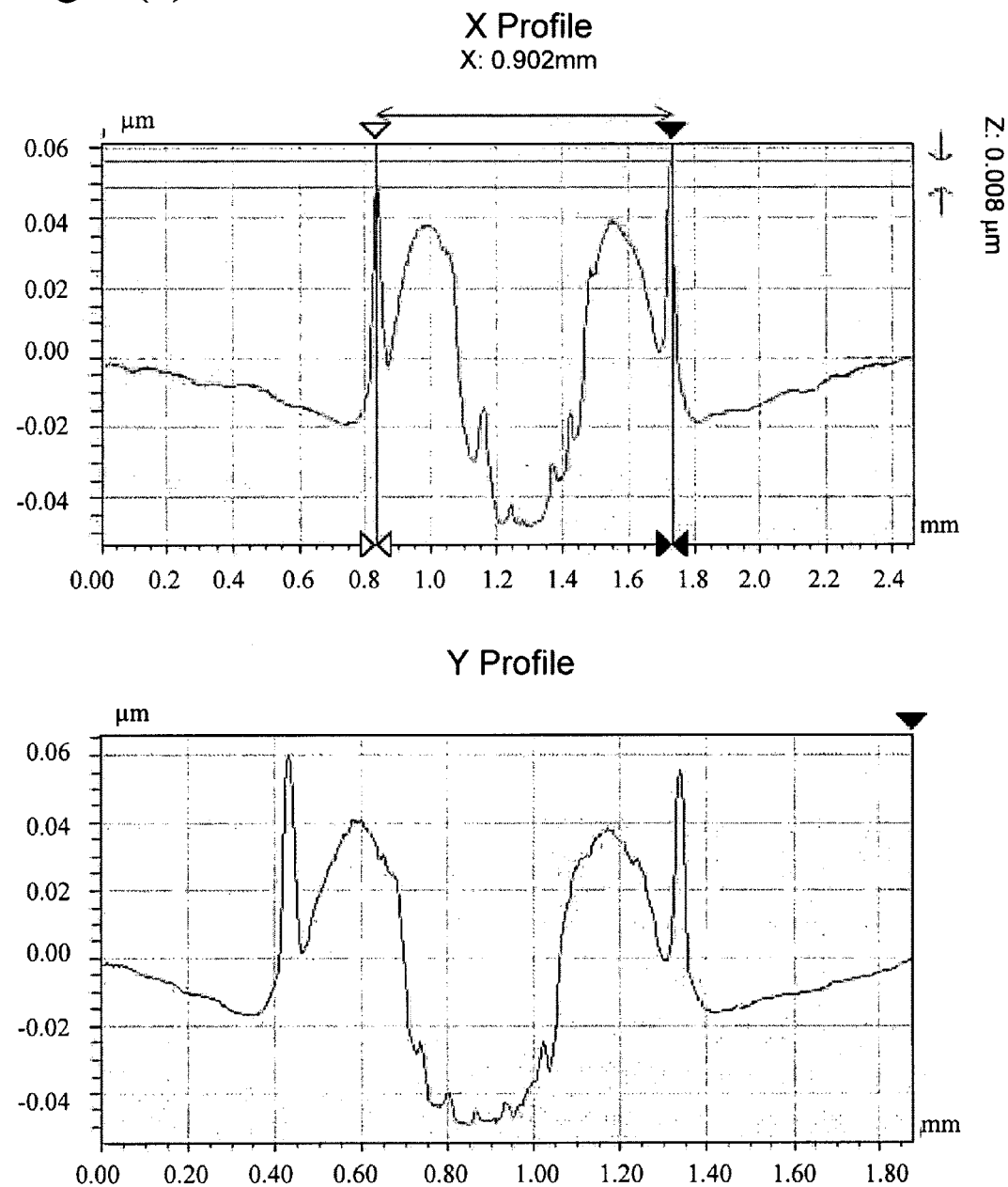
FIGS. 6(a) through 6(d) are a series of graphs representing selected profiles that illustrate the deviation from flatness of some of the fabricated membranes due to residual stresses, wherein FIG. 6(a) X: 0.902 mm.
Figure 6B:
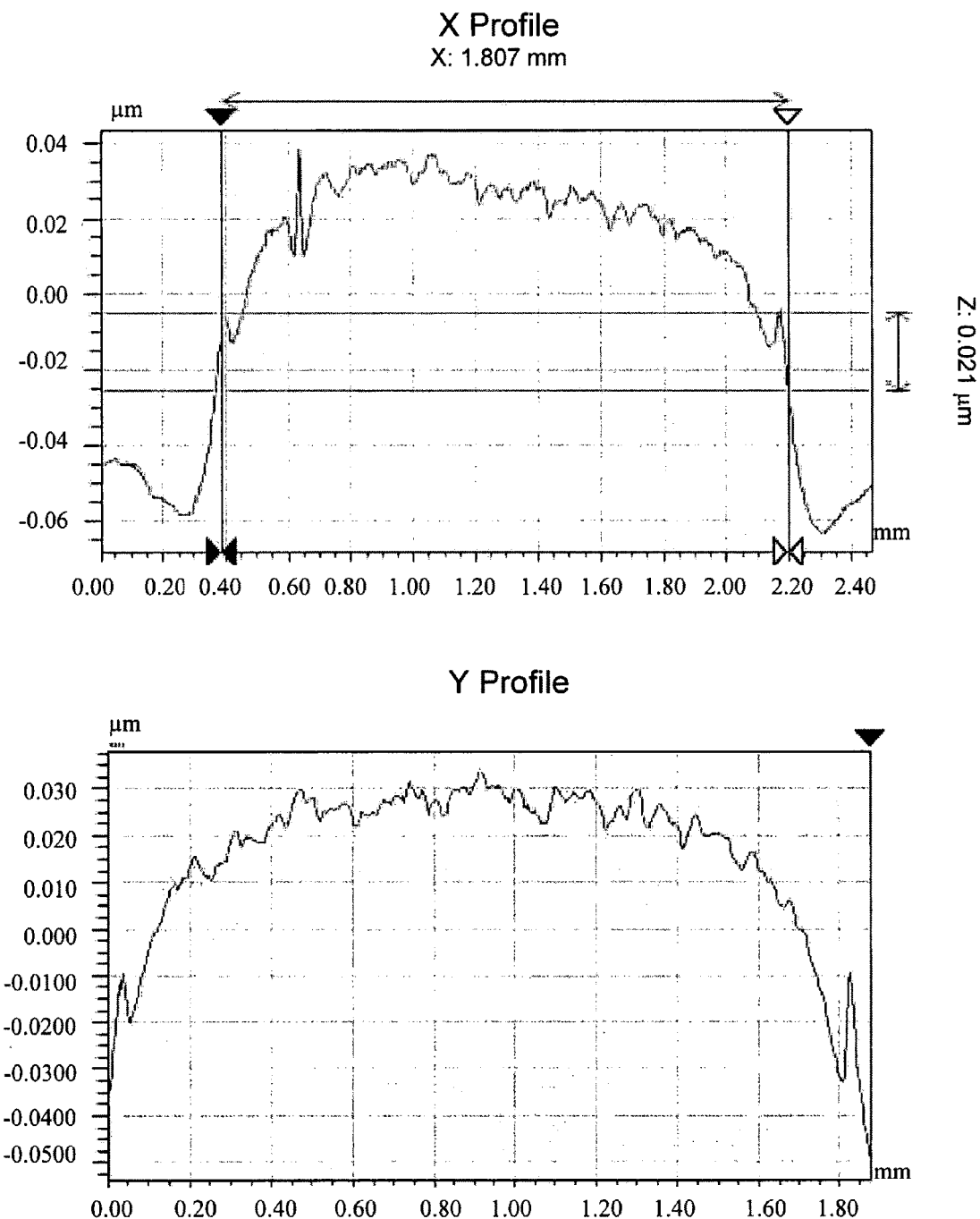
Figure 6C:
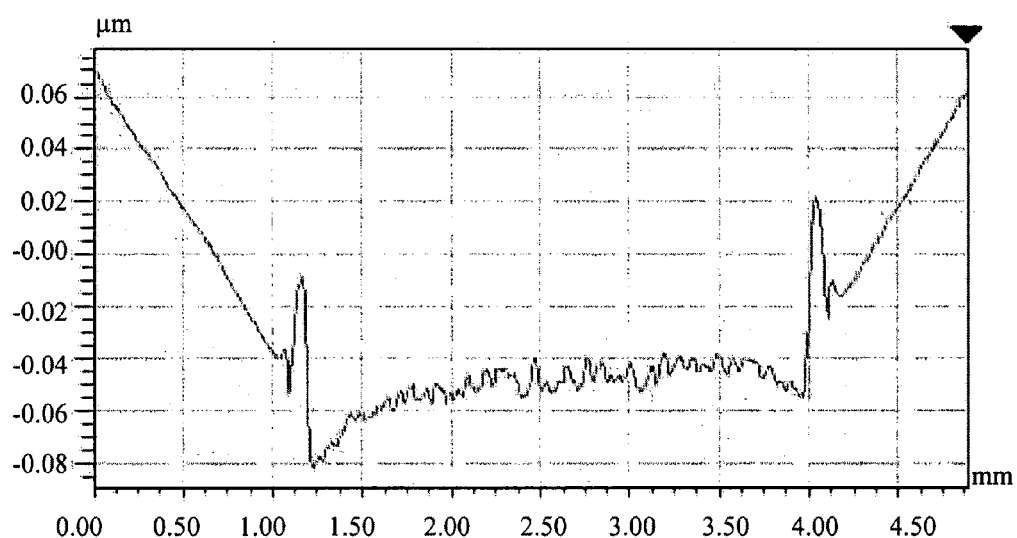
Figure 6C:
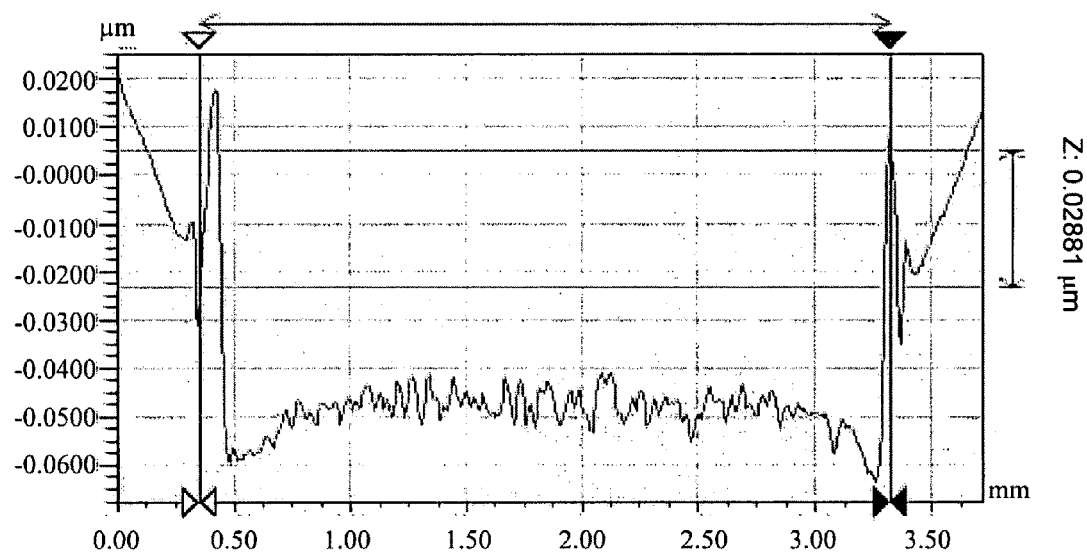
Figure 6D:
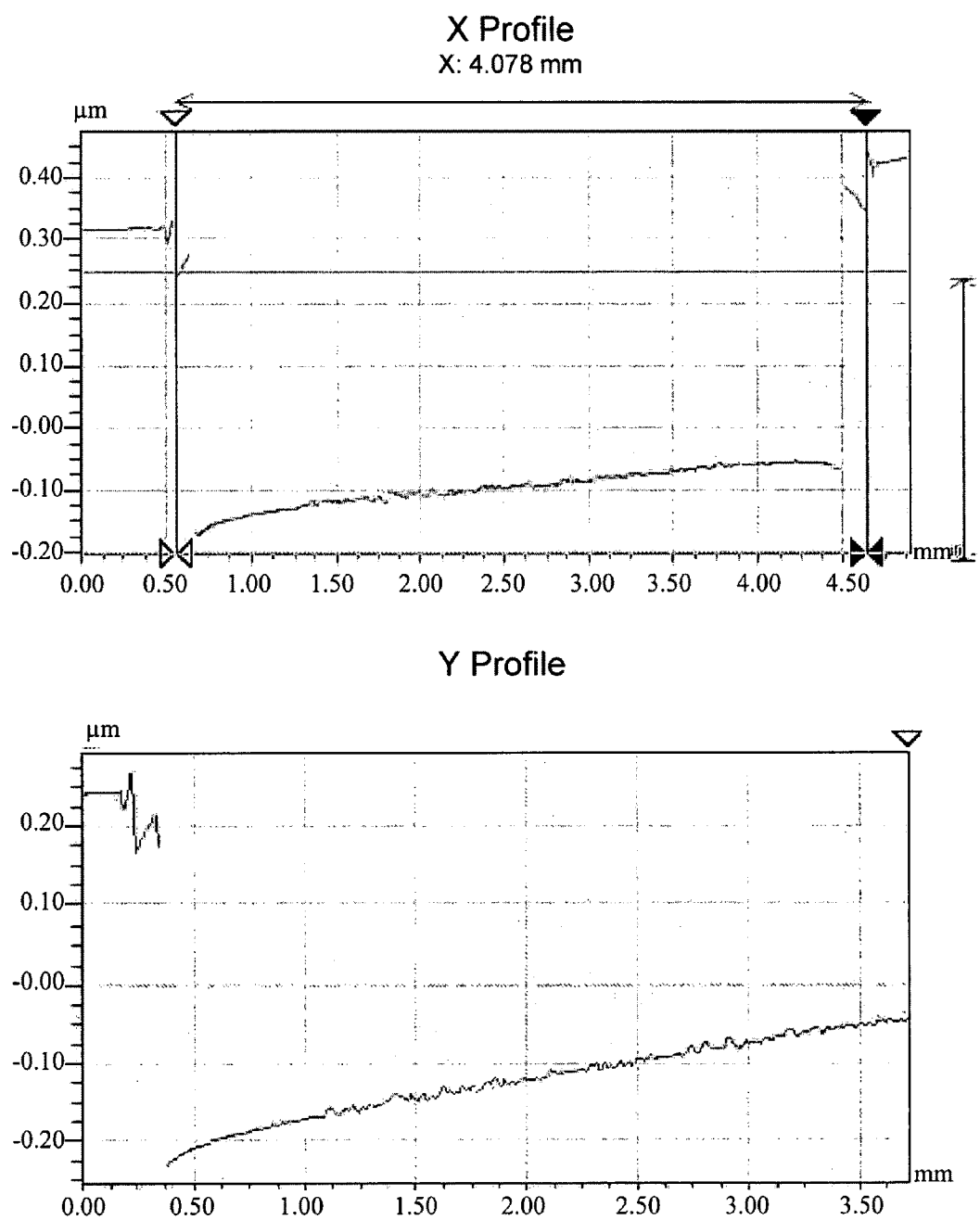

The fabrication methodology for the thermally induced single-use valves in accordance with the present invention is illustrated with reference to FIG. 4 and FIG. 5. As shown in FIG. 4, after an initial cleaning, the membrane fabrication process flow is illustrated and starts by forming a silicon nitride coating on the top and bottom surface of the silicon wafer 60. In a particular embodiment, the silicon nitride layers are formed by placing the wafers in a low pressure chemical vapor deposition (LPCVD) oven for 3.3, 6.6 and 10 hours resulting in silicon nitride coatings with thicknesses of 1, 2, and 3 μm, respectively.

After the silicon nitride has been deposited, one side of the wafer is patterned with the metal resistors via lift-off technique. Possible configurations of the metal resistors were previously illustrated with reference to FIG. 3. In a particular embodiment, titanium is sputtered to form an adhesive layer 65 for the subsequent platinum and gold deposition to the silicon wafer. Patterning of the resistive element 70 is then followed by sputtering of the metal layer 75. Possible metal layers include platinum and gold. Next, a photo-resist lift-off technique 80 is used to complete the resistive element and then the cavity is formed in the bottom surface of the wafer 85, resulting in a thin silicon nitride membrane having a patterned resistive element suspended over the cavity in the silicon wafer. In a specific embodiment, a positive photo-resist is deposited at 3000 rpm for 40 seconds and then is exposed for 2.9 seconds and immersion-developed for 35-40 seconds. A titanium layer (approximately 10 nm) is sputtered on the wafers to serve as an adhesion layer for the subsequent platinum and gold deposition to the silicon wafers. Table 2 summarizes the details of the sputtering and deposition times for the various metals and associated layer thicknesses Immersion in acetone for 20 minutes completes the lift-off patterning.

TABLE 2

Deposition conditions to sputter the metals used to fabricate the thin resistors.

| Metal | Sputtering tool used for the deposition | Deposition time, minutes | Average thickness, μm |
|---|---|---|---|
| Platinum | In-house built tool | 4 | 0.09 ± 0.025 |
| Platinum | In-house built tool | 16 | 0.30 ± 0.030 |
| Gold | ATC 1800 series (AJA International) | 15 | 0.15 ± 0.015 |

Silicon etching on the backside of the wafer to form the cavity, following the resistor patterning is illustrated in more detail with reference to FIG. 5. Two possible routes for the formation of the cavity are illustrated with reference to FIG. 5. In route A 90, the backside silicon nitride layer etching 60 was the first step, which in turn is used as a mask to perform batch chemical etching through the silicon wafer. In a particular embodiment, a negative photo-resist was then used with an appropriate field mask to pattern squares in the silicon nitride on the back face of the wafer 100. The negative photo-resist was deposited, spun at 1000 rpm for 40 seconds, and hot-plate baked at 150° C. for 80 seconds. A developer was then used, after a predevelopment bake on the hot-plate for 80 seconds at a temperature of 100° C. The exposure time was 20 seconds, and the immersion development time was 15 seconds. The achieved photo-resist thickness with this procedure is approximately 2.55 microns, as measured with a contact surface profiler. The silicon nitride on the back of the wafer is then completely removed from the desired square areas 105 by treating the wafers in a reactive ion etching (RIE) tool for a total of 115 minutes. After the photo resist is removed 110, silicon chemical etching of the wafer is used to form the cavity 115. In a specific embodiment, a silicon nitride etch recipe with a volumetric ratio of $CHF_3$ to $O_2$ of 45:5 was used. At the end of that time the photo-resist layer was drastically thinned, and the silicon nitride received localized attacks by the reactive etching. An immersion in 45% KOH solution at 90° C., to completely etch the silicon wafer, follows. The 500 um through-holes are achieved after a 5 hour immersion while agitating at 250 rpm in the KOH solution. The reported rate is about 100 μm per hour at 90° C., for <100> oriented wafers.

In an alternate route 95 for creating the through-holes on the wafer, the first step for the membrane fabrication is removing the silicon nitride from the backsides of the wafer 120. In a specific embodiment, this is done by exposing the wafers to reactive etching for 25 minutes per micron of silicon nitride deposited. An aluminum mask is then patterned using either liftoff or etching techniques with no apparent difference on the yield and characteristics of final valve-wafers. In a particular case utilizing the liftoff technique, an aluminum mask is patterned to define the through-holes on the backside of the wafer 125. Then a titanium layer is sputtered over as an adhesive layer 130. Next, aluminum is sputtered over the titanium layer 135 for fifteen minutes with a series sputtering system, resulting in a thickness of approximately 0.270 μm. Aluminum liftoff is then performed 140. The liftoff to pattern the aluminum required immersion in acetone for 1 hour and 15 minutes. For the wafers in which aluminum is patterned via etching, this metal is deposited first as described before, and etched selectively. Acidic etching removes the aluminum. photoresist that was used to mask the aluminum. A three solvent rinse is then performed and together with 1-minute oxygen plasma RIE removes any residues. Then the wafers are taken to the DRIE tool 145, where the silicon is completely removed in 3×3 mm² squares under the patterned resistors after the wafers are subjected to 700 Bosch-processing cycles.

The mechanical properties of the membrane can be used to predict the strength of the fabricated membranes. However, it is well known that a deposited membrane possesses intrinsic stresses related to the deposition technique and its conditions. FIGS. 6(a) through 6(d) show shows pictures generated with an optical profiler that illustrate the bending of selected membrane due to residual stresses induced while fabricating the square membranes. These and other membranes with different lateral sizes, D, will be utilized to test the maximum pressures that they can withstand. The graphs clearly show that the LPCVD deposition indeed induced intrinsic stresses to the fabricated membranes. The membranes, though, were strong enough for handling with the rest of the wafer which indicates a residual stress with a value less than 0.1 GPa.

Figure 7A:
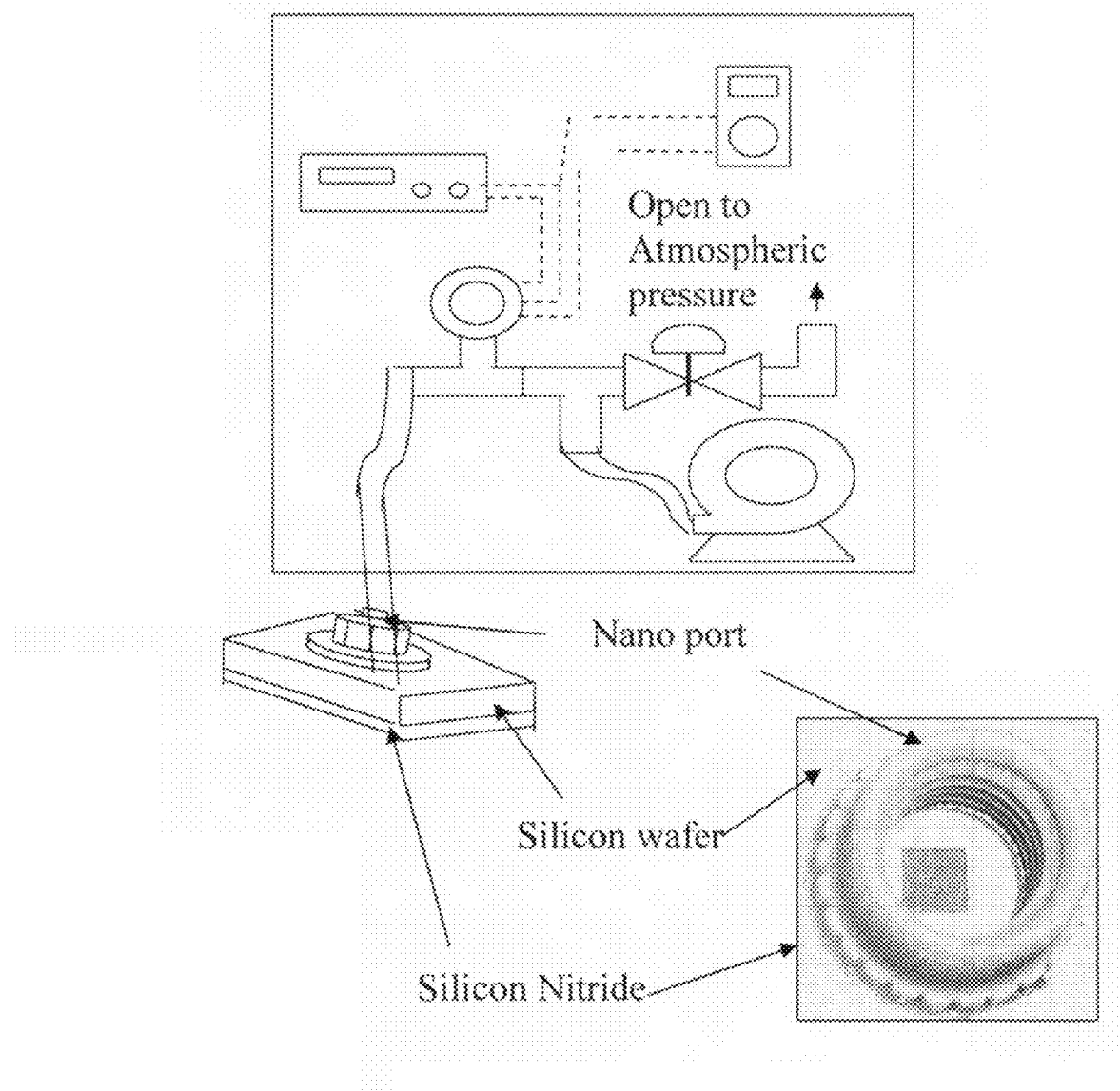
FIG. 7(a) is an illustration of the pressure testing set-up for the thermally induced single-use valves in accordance with the present invention and FIG. 7(b) is a graph illustrating the calibration curves for the sensor of the test set-up.
Figure 7B:
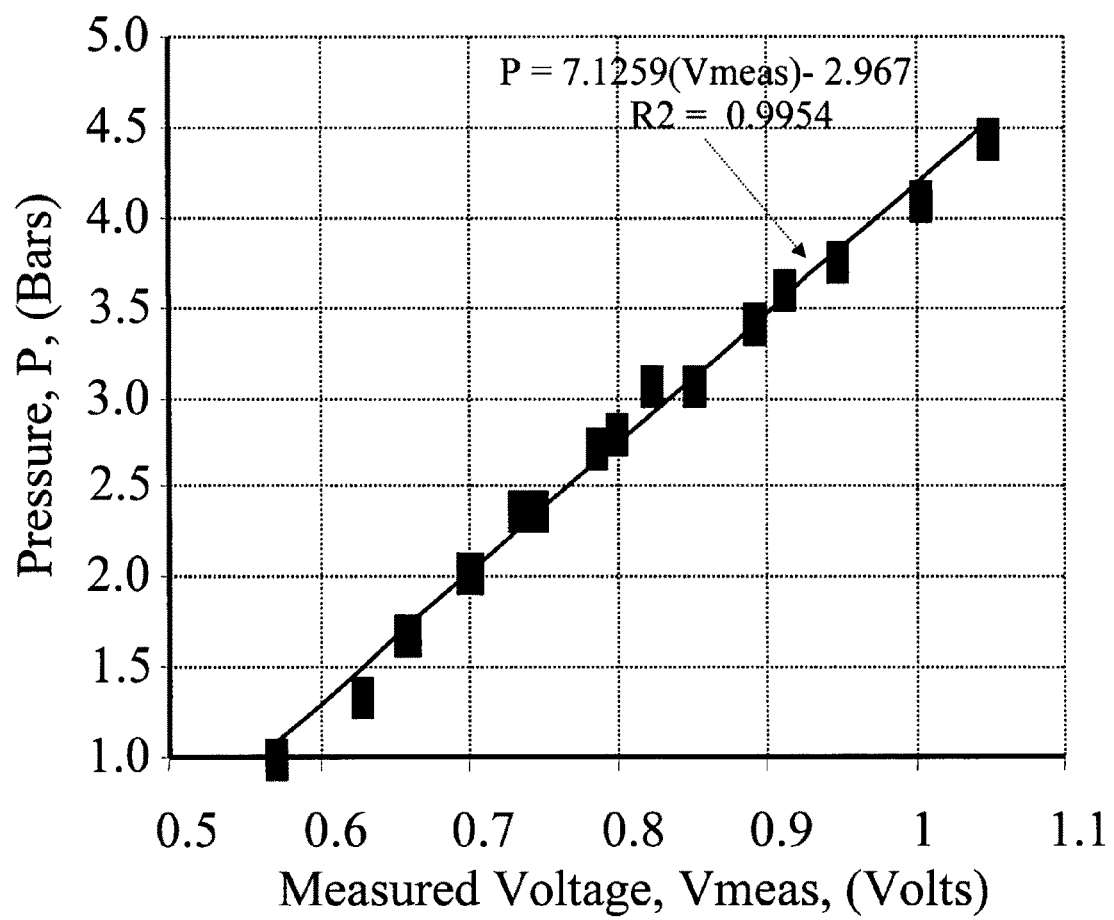

In a specific embodiment, in order to obtain an estimate of the maximum pressure under which the fluid can be stored, various sized square membranes (side lengths equal to 1, 1.5, 2, 2.5, 3 and 4 mm) of various thicknesses (1, 2, and 3 μm thick) were fabricated as described above. For testing purposes, commercially available nanoports were used. A schematic of the set-up used to measure the maximum pressure and obtain the calibration curve for the sensor is shown in FIG. 7(a) and a graphical illustration of the measured voltage and pressure is shown in FIG. 7(b). The pressure was induced via a compressor pump. The compressor was turned on while the exhaust valve was open, this valve was closed slowly and data was taken every second until the membranes failed.

Figure 8:
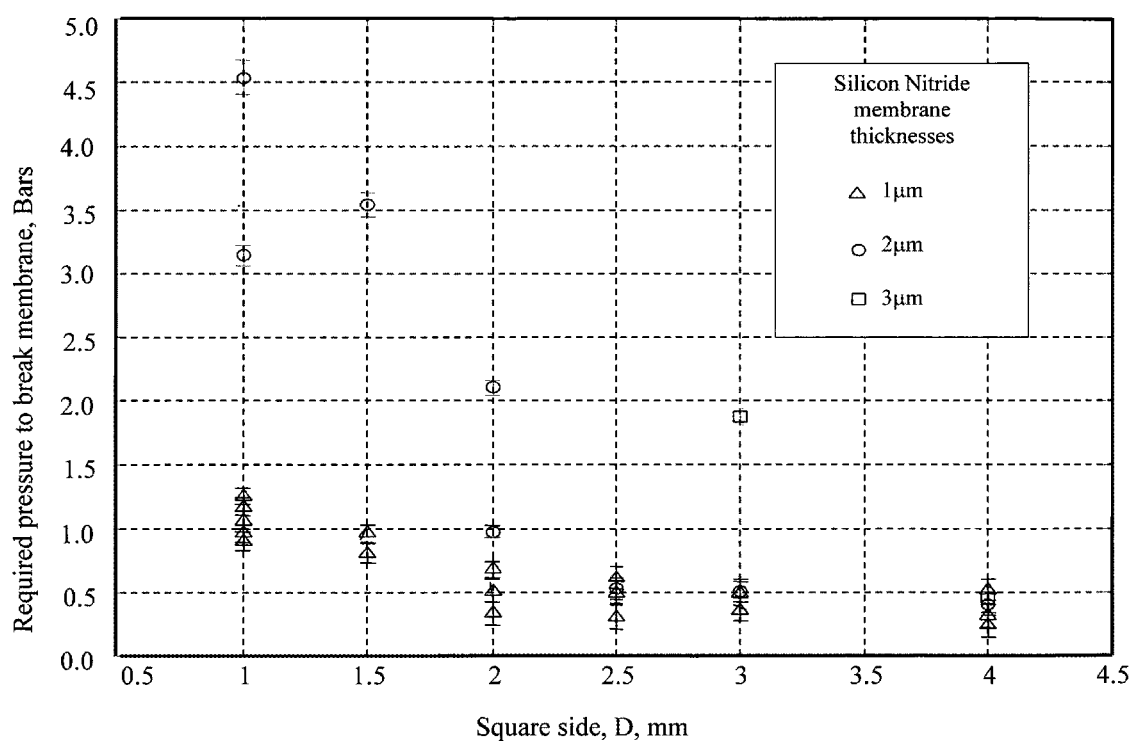
FIG. 8 is a graphically illustration of the maximum pressure withstood by a silicon nitride membrane of various dimensions in accordance with various embodiment of the invention.

The graphical illustration of FIG. 8 summarizes the experimental data points where breakage of the various silicon nitride membranes occurred while applying pressure. In the graphical illustration of FIG. 8, the dramatic increase in pneumatic strength of the membrane as the dimensions of the membrane are reduced is clearly illustrated. The continuous line-curves represent a model that has been fitted to the presented experimental data. Since only the largest membranes (D=4) with thicknesses equal to 3 microns broke, the model has been calculated to compare only with membranes of membrane thicknesses of 1 and 2 microns. This model is a simplification of equation 1. It assumes a uniform pressure applied and equates the pressure increment, ΔP, to the maximum shear stress, τ, and the membrane dimensions, $$\Delta P = (4\tau/D)/+k \quad (5)$$

The term k is an offset parameter that includes phenomenological aspects previously explained. As it is shown in FIG. 8, the modeled curves are in fair agreement with that of the experimental values obtained. FIG. 8 shows that the largest size membranes (with sides equals to 4.0 mm) break at low pressures, between 0.25 and 0.60 bars. As for membranes with 3.0 mm-sides, several of the five tested membranes with 1 and 2 microns thickness broke with a pressure in between 0.30 and 0.65 bars, while only one (out of five tested) of the 3 μm membranes broke when a pressure of 1.4 bars was applied, while the other ones tested remained unbroken up to a pressure of 5 bars. Because of the large pressure range of pressure for membranes with 3×3 mm² sides and a thickness of 3 μm this size is considered a preferred membrane to use in building the thermally activated valves of the present invention.

Thermal efficiencies of micro fabricated resistors are commonly reported as the required energy or the required application time of a certain power to achieve a certain temperature increment. In accordance with the present invention, constant voltages were applied using a DC-power supply, while the resistors were placed on a probe station. Since the resistor temperature changes during heating, its resistance (and power, as stated in equation 2) also varies as heating takes place. In order to be able to estimate the energy required for the resistor to reach a certain temperature, an estimate of the resistance that representatively estimates the change that takes place is necessary. This estimate, $R^T$, calculated as an average, $R_{ave}$, is shown below.

$$R_{ave} = (R_{Tamb} + R_{hot})/2 \qquad (6)$$

The first resistance, $R_{Tamb}$, represents resistance values at ambient temperature (18.9° C.+−0.2° C.) and are presented in Table 3, together with the calculated ones (using equation 4) for each exemplary resistor design presented.

TABLE 3

Calculated and measured resistances ($R_{Tamb}$) at an ambient temperature of 18-19° C. for the various resistor designs tested herein.

| Resistor design | Pt (0.09 μm) | Pt (0.30 μm) | Au (0.15 μm) | Pt (0.09 μm) | Pt (0.30 μm) | Au (0.15 μm) |
| --- | --- | --- | --- | --- | --- | --- |
| | Calculated Resistances (Ω) | | | Measured Resistances (Ω) | | |
| $L_1$ | 896 ± 320 | 269 ± 33 | 119 ± 12 | 1060 ± 390 | 268 ± 15 | 112 ± 05 |
| $L_2$ | 880 ± 310 | 281 ± 32 | 117 ± 11 | 882 ± 300 | 281 ± 35 | 119 ± 10 |
| $L_3$ | 1100 ± 400 | 330 ± 40 | 146 ± 15 | 1295 ± 350 | 332 ± 41 | 131 ± 14 |
| $L_4$ | 1320 ± 480 | 396 ± 48 | 176 ± 18 | 1616 ± 480 | 400 ± 50 | 171 ± 13 |
| $P_1$ | 104 ± 80 | 36 ± 4 | 13 ± 1 | 158 ± 118 | 33 ± 3 | 15 ± 2 |
| $P_2$ | 111 ± 86 | 39 ± 4 | 14 ± 2 | 167 ± 105 | 34 ± 4 | 16 ± 1 |
| $P_3$ | 119 ± 90 | 41 ± 5 | 15 ± 2 | 173 ± 88 | 37 ± 2 | 17 ± 1 |

Figure 9:
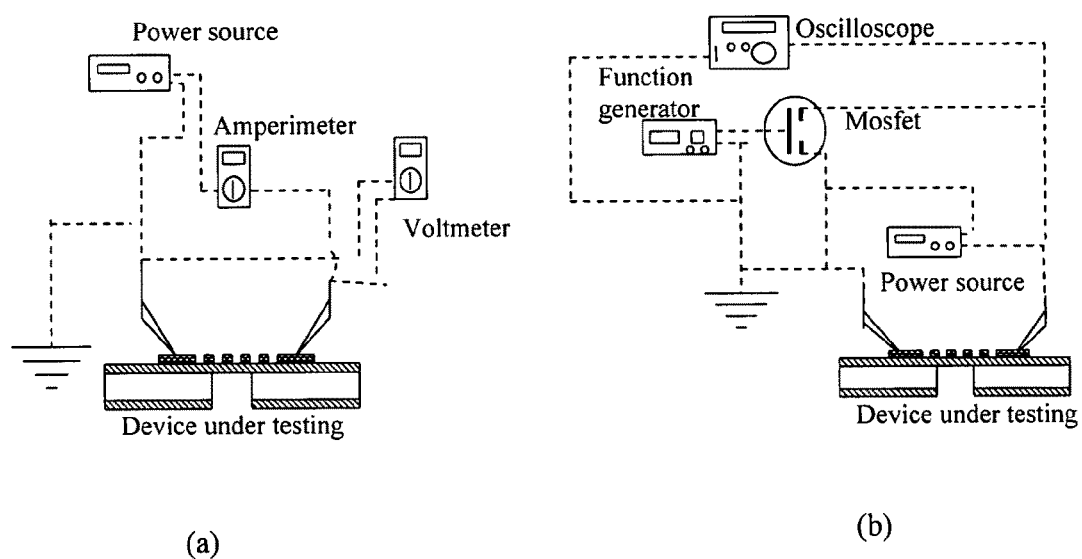
FIG. 9(a) is an illustration of the testing set-up for the micro fabricated valves of the present invention for obtaining a thermal response to various input powers and FIG. 9(b) is an illustration of the testing set-up for the micro fabricated valves of the present invention for applying electrical pulses to open the valves in accordance an embodiment of the invention.

The resistance value at the higher temperature, $R_{hot}$, is obtained empirically. To do so, various voltages were used to heat the resistors at various temperatures (at least five potentials, resulting in temperature ranges between 18-700° C., for each resistor. Multimeters were used for recording the voltage and the electrical current flowing through the circuit, as shown in FIG. 9(a). Current and voltage are used to calculate the input power, as well as the steady state resistance value (Ohm's law) of the heated resistor, $R^T$. The $R^T$ value is then used with equation 7 (an expression derived from equation 4) to estimate a steady state temperature, T, of the resistors.

$$T = T^0 + \frac{R^T - R^0}{\alpha R^0} \qquad (7)$$

Since it is a fact that a linear relationship exists between the power and temperature for micro-fabricated resistors, equation 2 suggests a temperature versus potential expression of the form:

$$T[°C.] = cV^2 + dV + 18.5 \qquad (8)$$

Figure 10:
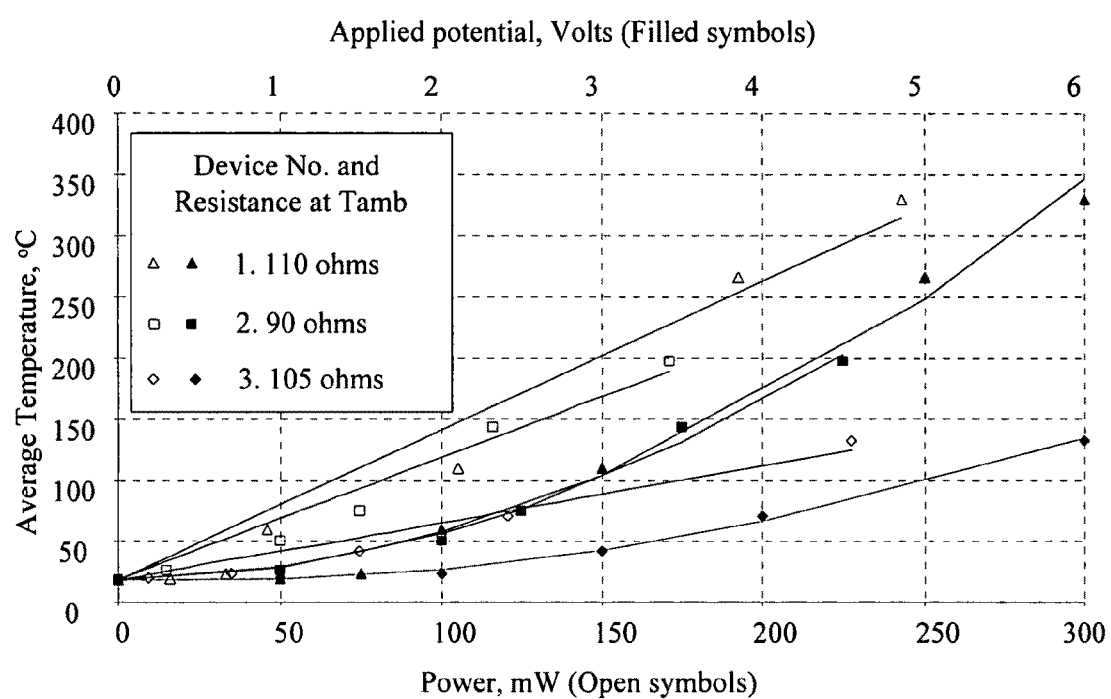
FIG. 10 is a graphical illustration of the experimental resistor temperature as a function of power (open markers) and applied potential (filled markers). The continuous line-curves represent modeled data as explained in the specification.

Calculated temperatures as a function of voltage data were input in a regression subroutine and the constants "c" and "d" in equation 8 were obtained. In order to illustrate examples of the energy required for heating that has been generated for the resistor designs, some of the data obtained with the $L_1$-labeled, gold resistors has been summarized in FIG. 10. FIG. 10 shows the steady state (stabilized) temperature that is reached as function of power (data points indicated as open symbols) and voltage (indicated with filled markers). The curves represented by continuous lines are least square minimized curves that seem to adequately describe the experimental data. As stated in the text, temperature increments are linearly related to the applied powers. The average correlation coefficient, r, a value which closeness to 1 indicates the goodness of the fitted line with the experimental data, has a value of 0.9820. The regressed curves that represent an average temperature as a function of the applied voltage are a second degree polynomial (eq. 8). In that case, the calculated average correlation coefficient is 0.9965. It should be pointed out that the figure evidences that smaller temperature increments (when compared to the other two valves) are achieved with the valve labeled as 3 in FIG. 10. The most likely reason for this fact is the position of this valve in the wafer. The valve is located in the edge of the wafer, position that exposes more area to the environment at a T=Tamb, inducing more convective heat losses (eq. 3) and that results in less heating efficiency as shown in the figure. Regression coefficients between 0.9682 and 0.9997 confirm the validity of the mathematical form of equation 8 for all the other resistors. Equation 8 allows then for the calculation of the expected $R_{hot}$ value. The calculated $R_{ave}$ was compared with a time-weighted resistor average value, $R_{ave(t)}$ (estimated by numerical integration using the trapezoidal rule) of actual resistance variations, that were measured using a constant resistor and an oscilloscope. Experimentally it was observed for the steady state temperatures for all the designs presented here, that $$|R_{ave} - R_{ave(t)}|/R_{ave(t)} < 10\% \qquad (9)$$

Since it was found that $R_{ave}$ is essentially equal to $R_{ave(t)}$, the contention of using $R^T = R_{ave}$ as a constant in equation 2 to estimate the required power, to reach and maintain a steady state temperature, T, can be used for the results presented in this section.

In order to estimate the required potential for opening each of the valve designs, and based on previous observations that similar silicon nitride diaphragms can withstand up to 650° C., voltages that would increase to temperature of around 700° C. were used here. As a first step to test the opening of the valves, an estimation of the required time pulse for achieving the steady state temperature was obtained. The calculated voltage was then applied to the tested device first during either 30, 50 or 100 milliseconds. If the valve did not break the pulse was then incremented to 50 milliseconds and after that in steps of 50 milliseconds until the valve either opened (breaking the silicon nitride membrane) or failed (resistor broke without breakage of the membrane).

In a particular embodiment, electrical pulses were produced via a HexFET N-channel power MOSFET triggered via a function generator. Table 4 shows the applied potential, the duration of the applied pulse, and the estimated energy for opening the valve. The power estimation (as described above) assumes that steady state temperatures were reached right before the resistor broke. The energy requirements were obtained by multiplying the calculated power by the pulsing time, $t_p$.

TABLE 4

Applied potentials, pulsing duration, and energetic requirements to open the valves.

| | Platinum (0.09 μm) | | | Platinum (0.30 μm) | | | Gold (0.15 μm) | | |
|---|---|---|---|---|---|---|---|---|---|
| Resistor design | Applied Voltage | Pulse msecs | Energy mJoules | Applied Voltage | Pulse msecs | Energy mJoules | Applied Voltage | Pulse Msecs | Energy mJoules |
| $L_1$ | 100 | 200 | 394 | 47 | 50 | 123 | 13 | 100 | 140 |
| $L_2$ | 75 | 200 | 662 | 45 | 30 | 44 | 18 | 200 | Failed |
| $L_3$ | 80 | 200 | 543 | 55 | 50 | 116 | 25 | 200 | Failed |
| $L_4$ | 100 | 400 | 809 | 50 | 100 | 225 | 25 | 400 | 658 |
| $P_1$ | 20 | 200 | 235 | 12 | 100 | 127 | 3 | 100 | Failed |
| $P_2$ | 30 | 200 | 334 | 16 | 100 | 316 | 5 | 100 | Failed |
| $P_3$ | 35 | 200 | 490 | 18 | 100 | 460 | 8 | 100 | Failed |

In an additional embodiment, to further decrease the required energy for valve activation the potential applied to the devices is increased, which therefore decreases the heating time of the valve to the breaking temperature. Higher potentials than those shown in Table 4, applied for shorter pulse times (10 to 30 milliseconds) can then be used. In this case, it is expected that the breaking temperature would not be the ultimate steady state temperature that the resistor could achieve. Because of this the required energy was calculated by recording the electrical current as function of time (I(t)) flowing through the resistor. This was done using a constant resistor (of similar magnitude that the design that is being measured) and a digital oscilloscope. This measurement also provided the pulsing time required for membrane breakage (tp). The energy was then integrated numerically using trapezoidal rule.

$$\text{Energy} = V \int I(t) dt \quad (10)$$

Figure 11:
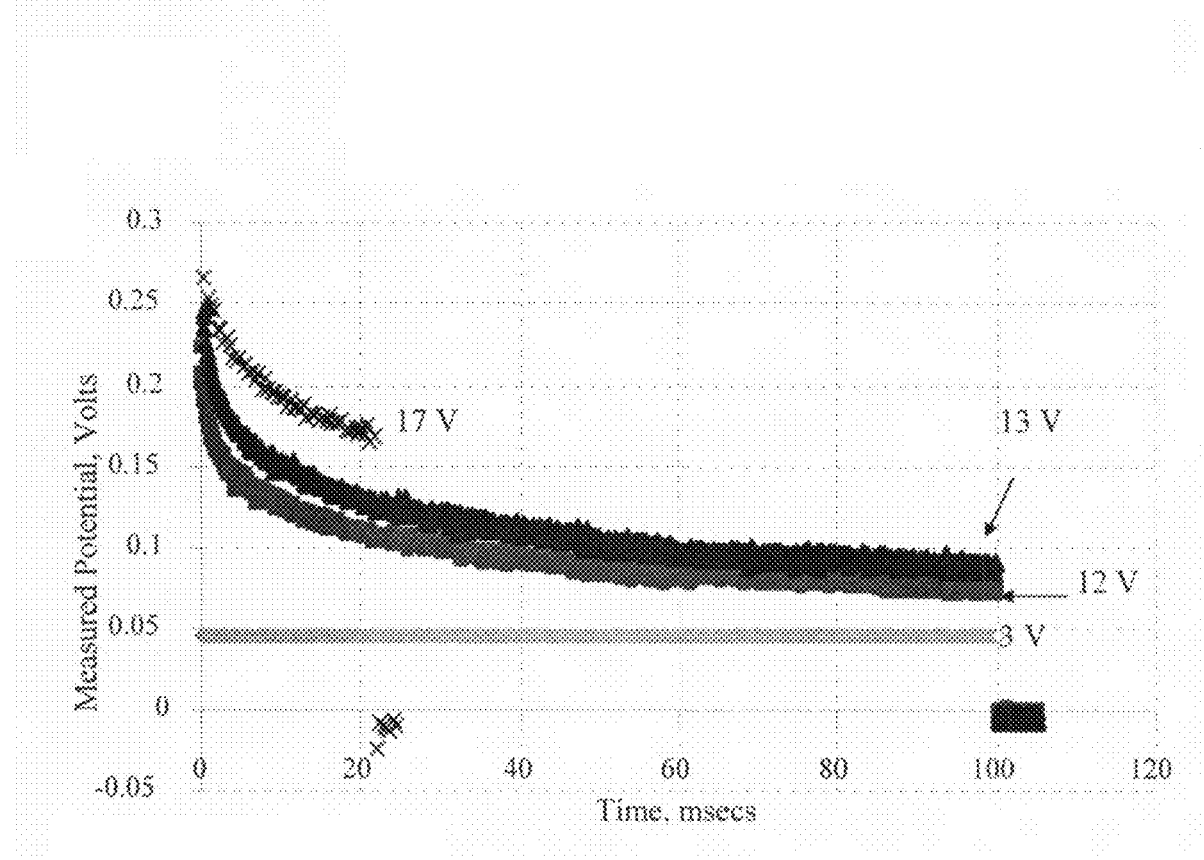
FIG. 11 is a graphical illustration of the experimental results obtained from the gold, L1-labeled resistor. Potential drop measured through an external resistor during applied square pulses at the shown potentials.
Figure 12:
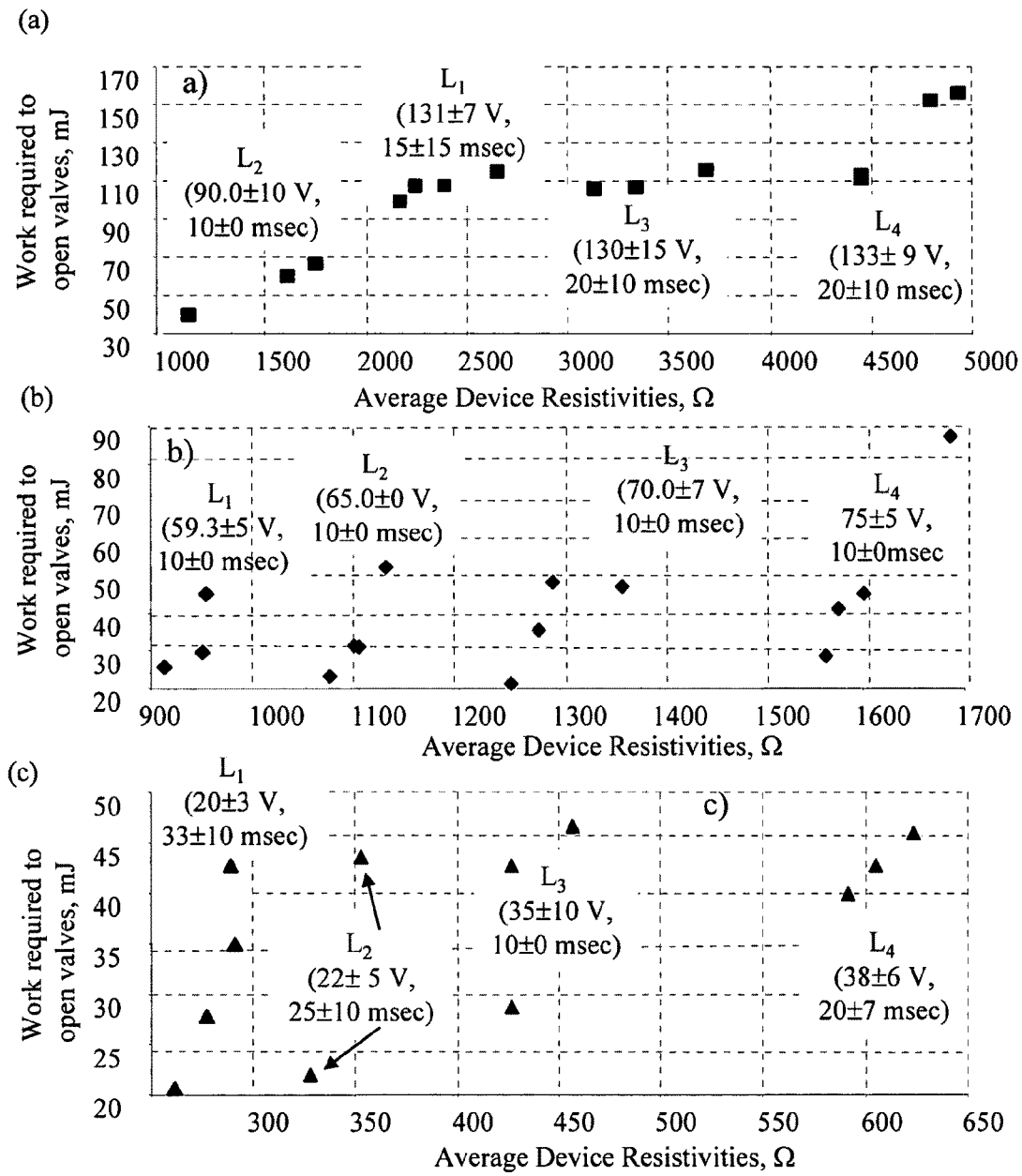
FIG. 12 is a graphical illustration of the energy required to break zig-zag resistors designed as shown in table 1.
Figure 13:
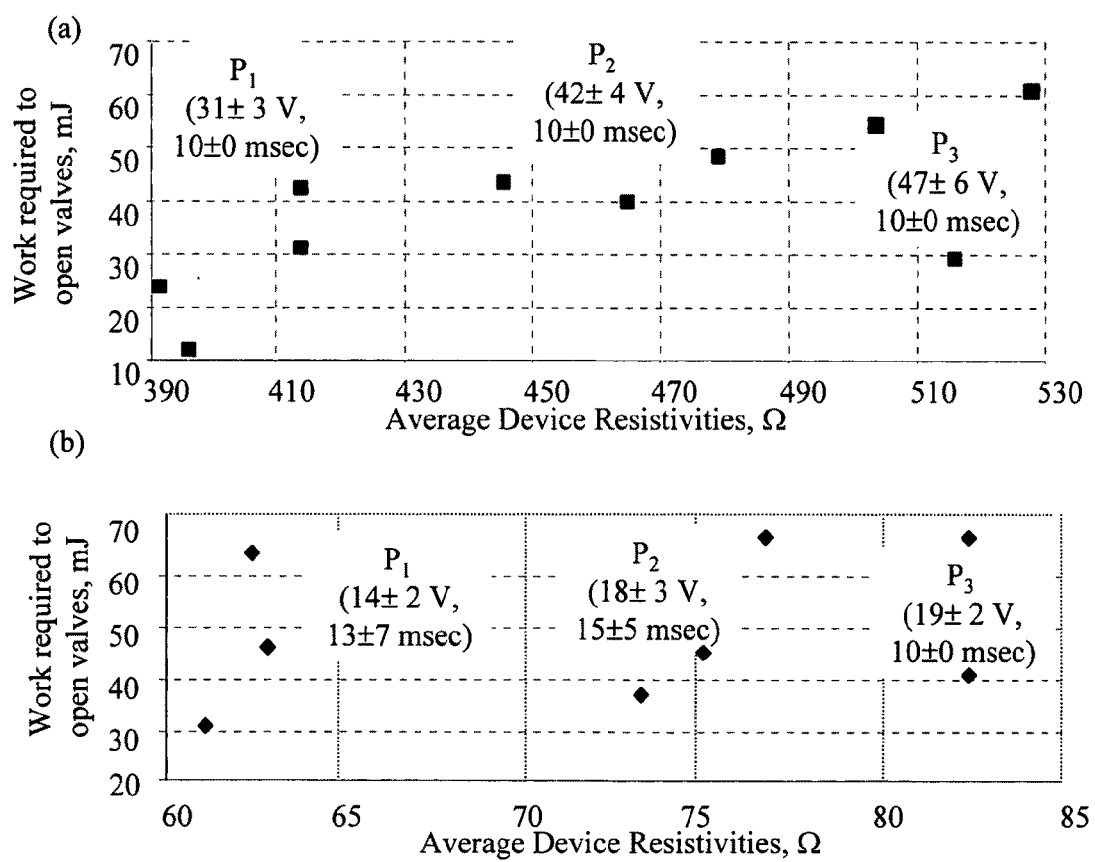
FIG. 13 is a graphical illustration of the energy required to open valves with two-legs-in-parallel resistor designs.

Potential drop measured through an external resistor during applied square pulses is shown in FIG. 11. The potential shown next to each curve is the applied voltage to the resistor. When the two higher voltages are applied (13 and 17 Volts), the membrane breaks, opening the valve. The calculated energy required to open the resistors actuated with 13 V is one order of magnitude higher (about 4 times more) than that utilized with 17 Volts. For that case, if integration of the power is performed as function of time, the energy required was around 44 mJ. If an average power is calculated and multiplied by the time required for breakage (22 mseconds), the estimated energy required to open the valve was 43 Joules. The fact that these values differ by less than 1 percent show that integration can be avoided to obtain the valve energetic requirements, as previously stated. Energetic requirements were calculated for all the successful replicate cases (in all designs at least 3 out of 4 or 4 out of 5 of the resistors broke together with the membrane) and are presented in FIGS. 12 and 13. The calculated energy for each device is shown as a function of their resistance. FIG. 12(a) shows the energy required to break a platinum zig-zag resistor with an average thickness of 0.09 μm±0.025 μm. FIG. 12(b) shows the energy required to break a platinum zig-zag resistor with an average thickness of 0.30 μm±0.030 μm. FIG. 12(c) shows the energy required to break a gold zig-zag resistor with an average thickness of 0.15 μm±0.020 μm. FIG. 13(a) shows the energy required to break a two-legs-parallel platinum resistor with an average thickness of 0.09 μm±0.025 μm. FIG. 13(b) shows the energy required to break a two-legs-parallel gold resistor with an average thickness of 0.15 μm±0.020 μm. The applied potential as well as the time during which the voltage was applied is shown in parenthesis. The figures clearly show the effect of the resistor design. The average potential and pulse-time (with both a plus/minus voltage and duration of the successfully tested devices) has been included close to the corresponding data cluster for each design.

In accordance with the present invention is provided the basis for a micro fabrication process to produce reliable, single-use valve-arrays fabricated with metals and silicon nitride, based on rapid thermal induction of stresses. The presented thermal testing and characterization of the resistors on the valves serves as a guideline to design resistors with specific activation power requirements. The valves are activated with low power (in some cases with energetic requirements in the order of tens of millijoules) and different activation voltage/current pairs, potentially facilitating the implementation in a device. Results for the maximum pressure that various size valves can withstand have been presented. Fabricated and tested valves with dimensions of 3×3 mm$^2$ and 3 μm-thickness can withstand a pressure gradient of at least 5 bars. The low power requirements of single-use activated membranes is a requirement for the implementation of a valving mechanism and is attractive for the development of remote and even portable systems. Additionally, the fabrication steps ensure high-production levels (at least 75% of the produced devices were successfully tested) and low-cost, making this fabrication method suitable for the production of expendable devices.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A thermally induced single-use valve, comprising:
   a silicon wafer having a top surface and a bottom surface and at least one cavity formed in the bottom surface of the wafer;
   a thermally deformable silicon nitride membrane suspended across the cavity on the top surface of the wafer; and
   at least one resistive element patterned on top of the thermally deformable silicon nitride membrane.

2. The thermally induced single-use valve of claim 1, further comprising a voltage supply configured to establish a voltage across the resistive element.

3. The thermally induced single-use valve of claim 2, wherein the voltage supply is a pulsed DC voltage supply.

4. The thermally induced single-use valve of claim 1, wherein the thermally deformable silicon nitride membrane has an average thickness of between about 1 µm and about 3 µm.

5. The thermally induced single-use valve of claim 1, wherein the thermally deformable silicon nitride membrane has an average thickness of between about 1 µm and about 3 µm and a geometric shape of a square having sides about 3 mm in length.

6. The thermally induced single-use valve of claim 1, wherein the resistive element is a platinum patterned resistor.

7. The thermally induced single-use valve of claim 1, wherein the resistive element is a gold patterned resistor.

8. The thermally induced single-use valve of claim 1, wherein the resistive element is a zig-zag resistor.

9. The thermally induced single-use valve of claim 1, wherein the resistive is a two-legs-in-parallel resistor.

10. A method for supplying a fluid under pressure to a channel, the method comprising the steps of:
positioning a thermally induced single-use valve between the fluid and the channel, the thermally induced single-use valve further comprising a silicon wafer having a top surface and a bottom surface and at least one cavity formed in the bottom surface of the wafer, a thermally deformable silicon nitride membrane suspended across the cavity on the top surface of the wafer and at least one resistive element patterned on top of the thermally deformable silicon nitride membrane; and
heating the resistive element, thereby causing the thermally deformable silicon nitride membrane to rupture, opening the valve and releasing the fluid to the channel.

11. The method of claim 10, wherein the step of heating the resistive element further comprises applying a voltage across the resistive element.

12. The method of claim 11, wherein the step of applying a voltage across the resistive element further comprises applying a pulsed DC voltage.

13. The method of claim 10, wherein the resistive element is a platinum resistor patterned on the thermally deformable silicon nitride membrane.

14. The method of claim 10, wherein the resistive element is a gold resistor patterned on the silicon nitride thermally deformable membrane.

15. An apparatus for supplying a fluid under pressure to a channel, the apparatus comprising:
at least one thermally induced single-use valve further comprising, a silicon wafer having a top surface and a bottom surface and at least one cavity formed in the bottom surface of the wafer, a thermally deformable silicon nitride membrane suspended across the cavity on the top surface of the wafer and at least one resistive element patterned on top of the thermally deformable silicon nitride membrane;
a voltage supply configured to establish a voltage across the resistive element;
at least one pressurized reservoir for holding the fluid; and
at least one supply line positioned between the at least one pressurized reservoir and the at least one thermally induced single-use valve.

16. The apparatus of claim 15, wherein the resistive element is a platinum resistor patterned on the thermally deformable silicon nitride membrane.

17. The apparatus of claim 15, wherein the resistive element is a gold resistor patterned on the thermally deformable silicon nitride membrane.

* * * * *